W. TRABUE.
Assignor to the TRABUE ARMS COMPANY,
MAGAZINE FIRE ARM.
No. 10,690. Reissued Feb. 16, 1886.
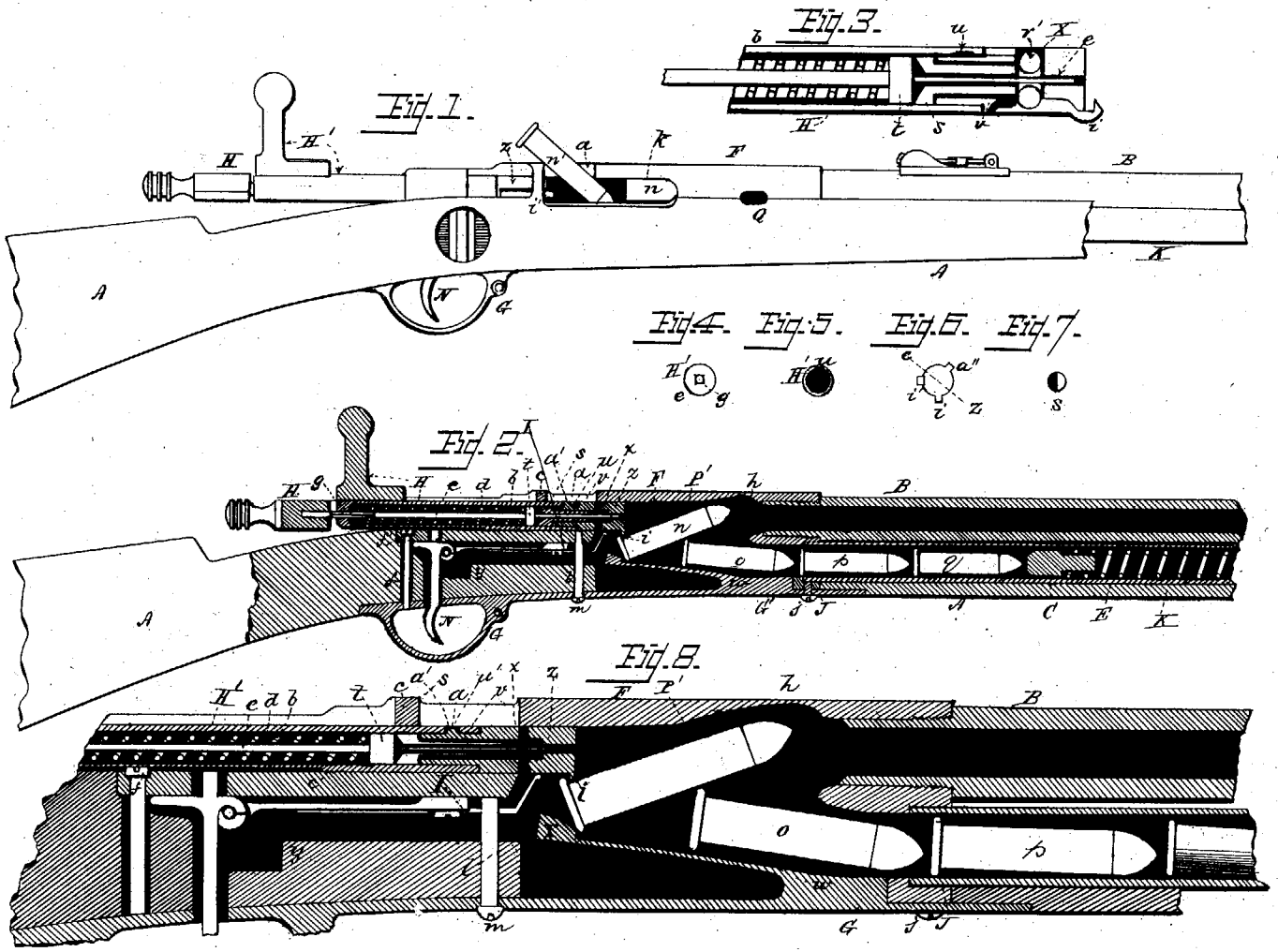
Witnesses
Wm. A. Pollock
Wm. Gardner.
Inventor.
William Trabue
By his Attorney
E. N. Dickerson Jr.
N. PETERS, Photo-Lithographer, Washington, D. C.

UNITED STATES PATENT OFFICE.

WILLIAM TRABUE, OF LOUISVILLE, KENTUCKY, ASSIGNOR TO THE TRABUE ARMS COMPANY, OF SAME PLACE.

MAGAZINE FIRE-ARM.

SPECIFICATION forming part of Reissued Letters Patent No. 10,690, dated February 16, 1886.

Original No. 223,414, dated January 6, 1880. Application for reissue filed October 13, 1883. Serial No. 108,935.

*To all whom it may concern:*

Be it known that I, WILLIAM TRABUE, of Louisville, county of Jefferson, and State of Kentucky, have invented certain new and useful Improvements in Magazine Fire-Arms; and I do hereby declare the following to be a clear, full, and exact description thereof, reference being had to the accompanying drawings, which form a part of this specification.

The said invention relates to that class of fire-arms known as "magazine-guns;" and it has for its chief objects the simplification and increased efficiency of the devices which operate to bring the successive cartridges from the magazine into position to be exploded, and of the devices by which the shell is extracted from the gun.

Figure 1 is a side view of the gun. Fig. 2 is a vertical longitudinal section. Fig. 3 is a sectional view of the bolt-head and extractor, retracting-tube, and firing-pin. Fig. 4 is a view of the rear end of the bolt and firing-pin. Fig. 5 is a front end view of the bolt with the bolt-head removed. Fig. 6 is a front end view of the bolt-head. Fig. 7 is a rear end view of the retracting-tube. Fig. 8 is an enlarged sectional view of Fig. 2.

Like letters designate corresponding parts in all the figures.

A, Figs. 1 and 2, is the stock of my improved fire-arm, and B the barrel. H′ is the bolt. This bolt is made tubular, and is provided with a bolt-head, *z*. To this head I attach a combined lever and extracting-hook, *i′*. The said lever and hook are placed within a corresponding recess and mortise, *x*, the lever being pivoted between the center and circumference of bolt-head *z*, upon the side diametrically opposite to the point which draws the shell.

The lever *i′* is provided with an aperture corresponding with the center of the bolt-head for the passage of the firing-pin. The rear of the bolt-head is provided with an extension-tube, which projects into the front end of the bolt H′, where it is held in position by means of a lug, *a′*, projecting into the lateral groove *u′* in said bolt. This groove extends about one-half the distance around the inner circumference of the bore of said bolt, as shown by the dotted line, Fig. 5. In this view *u* represents the end of a longitudinal groove, which connects with lateral groove *u′*, the groove *u* being for the purpose of permitting a connection to be formed between the bolt and its head.

The object of the lateral groove is to allow the bolt H′ to rotate or rock while the head *z* remains idle, but movable therewith when said bolt is moved in a longitudinal direction.

The bolt-head is kept from rotating by means of a lug, *a″*, (shown projecting in Fig. 6,) which lug projects into a longitudinal groove within the frame F. The length of this groove equals the movement of said bolt-head.

The bore of the extension-tube in the rear of the bolt-head *z* extends to and unites with the mortise *x*, for the purpose of receiving the retracting-tube *v*, provided with a head, *s*, which has a V-shaped notch formed therein.

One of the purposes for which the retracting-tube is employed is to press against the combined lever and extraction-hook *i* and insure its contact with the cartridge-cases prior to their explosion; but said hook is not dependent upon said tube for its contact with said cases while they are being extracted from the chambers of the barrel, for the hold of the hook on said cartridges will be in proportion to the resistance offered by reason of the pivotal point around which the hook rotates being placed to one side of the draft of said hook and at a distance in the rear thereof. When, however, the shells are drawn from the chamber of the barrel into the open chamber P′, this resistance ceases, and said shells would partially drop from the hook, were it not for the pressure transmitted from the mainspring *b*, through the retracting-tube *v*, to said hook, whereby the shells are kept in contact with the side of the frame until the flange of the shells recedes into a recess formed in said frame at the end of the backward movement of the bolt-head, thus causing the open end of the shell to fly out of the narrow opening P, while the base thereof is ejected through the large opening P′.

The firing-pin *e* is provided with a V-projection formed on the head *t*, which fits into the V-notch formed in the head of the reciprocating and non-rotating retraction-tube *v*. The parts *t* and *s* are brought together prior to the act of firing; but the firing-pin is immediately retracted when the bolt H′ is rotated from its firing position, as shown in Fig. 2.

H is a hammer connected to the firing pin *e*, which is provided with a polygonal reciprocating bearing fitting into a corresponding aperture, *g*, in the rear end of the bolt H′, said bearing and aperture being for the purpose of causing the firing-pin to rotate with the bolt. The under side of the bolt H′ is made flat to a distance corresponding with the movement of said bolt. A shoulder, *c′*, is formed on the bolt, which strikes against the stop *f′* when the bolt is withdrawn. About one-fourth of the under side of the hammer is cut away for the purpose of permitting said hammer to rotate with the bolt H′.

The spring I, Fig. 2, is shown depressed by the bolt-head *z*; but when said bolt-head is sufficiently retracted the end of said spring will spring upward on a line or a plane between the wide and narrow openings P′ and P, and within the alignment of the bore of the barrel B.

The object of the spring is to prevent the cartridges from being thrown out of due alignment with the bore of the gun by preventing the cartridges entering the enlarged opening P′, thus keeping them adjacent to the narrow opening P until forced into the chamber of its barrel B by the action of bolt H.

The frame F is recessed at *h*, as shown in Fig. 2, the object being to prevent an undue movement of the spring of the inclined cartridge-guide *w* when lug *i* engages with the flanges of the cartridge. Said lug is brought in contact with said flange in its retrograde movement, and in conjunction with shoulder *r*, formed on guide *w*, causes the points of the cartridges to be elevated to the cavity *h*. In the meantime the elevated cartridge is underrun by the succeeding cartridge, which is being propelled from the magazine E by spring K.

When the elevated cartridge is to be forced into the chamber of the barrel, the bolt H′ is drawn back until lug *i* is disengaged from the flange of the cartridge-case, after which the continued action of the magazine-spring will force the underrunning cartridge up the inclined guide until its flange strikes the shoulder *r*. During this action the base of the elevated cartridge is brought in contact with stop-spring I, and dropped into alignment, or nearly so, with the bore of the gun, into which it is forced by the reverse action of the bolt.

G and G′ represent a combined trigger-guard and inclined cartridge-guide, which is preferably made in one piece; but said guard and guide can be made in parts and accomplish the same object.

The object of the inclined guide *w* is to convey the cartridges from the chamber below the barrel upward and before the bolt-head, so that when the bolt-head is advanced it may come in contact with the rear of the cartridge and force it forward and into the barrel. It will be readily understood that it performs this function in connection with the spring beneath the barrel, which forces the cartridges backward and thence upward before the bolt. The spring forces back the cartridges upon the inclined guide *w* to a point beneath the bolt-head *z*, so that when said bolt-head is drawn back the lug *i* will come in contact with the flange of said cartridges. In order to disengage the lug from said flange when the point of the cartridge is elevated to the frame at *h*, the inclined guide yields to the pressure transmitted from the bolt-head and lug through the cartridge-flange until the depression of said guide is sufficient to admit of the passage of the lug over said flange.

The screws *f*, *m*, and J connect the combined trigger, guard, and guide G and G′ to the frame F.

N represents the trigger, and *y* the trigger-spring.

*a* is an aperture in the top of the frame, through which the cartridges are introduced when the magazine is to be filled. Said aperture communicates or is cut into the side aperture, P.

An unyielding guide, *w*, may be employed in combination with a yielding lug properly adjusted within the bolt-head *z*; or a spring or its equivalent may be adjusted within the top of the frame at *h*.

What I claim, and desire to secure by Letters Patent, is—

1. The inclined spring-guide *w*, provided with a cartridge-stop, *r*, in combination with the magazine located beneath the barrel B, and the bolt-head *z*, with its lug *i*, as and for the purpose herein specified.

2. The bolt-head *z*, with the lug *i*, or its equivalent, and the inclined cartridge-guide *w*, provided with stop *r*, or its equivalent, in combination with the cartridge-magazine E and its spring, or its equivalent, for the purpose specified.

3. In combination with a magazine fire-arm, a spring, I, located in the receiver in a position which will admit of its springing within alignment of the bore of said fire-arm, substantially as and for the purpose specified.

4. The pressure-tube *v*, firing-pin *e*, and mainspring *b*, in combination with the combined lever and extracting-hook *i* and bolt-head *z*, for the purpose described.

5. The frame F, recessed at *h*, in combination with the shoulder *r′* and lug *i*, and bolt-head *z*, as and for the purpose described.

6. The combination, in a repeating fire-arm, of a barrel, a chamber beneath the barrel provided with a spring forcing the cartridges backward, and an inclined guide located in a fixed position at the end of the cartridge-chamber beyond the barrel, for the purpose of elevating the rear of the cartridge when the bolt-head is withdrawn, thereby bringing the rear end of the cartridge before the bolt-head, permitting it to be forced forward and into the barrel, substantially as described.

WILLIAM TRABUE.

Witnesses:
A. H. ROBINSON,
WILLIAM KELDAY, Jr.